United States Patent [19]
Landa et al.

[11] Patent Number: 5,104,717
[45] Date of Patent: Apr. 14, 1992

[54] INK AND MULTISTRIKE RIBBONS INCORPORATING THE SAME

[75] Inventors: Benzion Landa, Edmonton, Alberta, Canada; Avner Schneider, Nes Ziona, Israel

[73] Assignee: Spectrum Sciences B.V., Rotterdam, Netherlands

[21] Appl. No.: 351,529

[22] Filed: May 15, 1989

[51] Int. Cl.⁵ .......................................... B41M 5/025
[52] U.S. Cl. ................... 428/141; 400/241; 400/241.1; 400/241.2; 428/156; 428/167; 428/195; 428/207; 428/246; 428/290; 428/304.4; 428/321.3; 428/327; 428/334; 428/335; 428/341; 428/401; 428/480; 428/914
[58] Field of Search ............... 106/20; 428/195, 206, 428/207, 321.3, 913, 914, 141, 156, 167, 246, 290, 304.4, 334, 335, 341, 401, 480; 400/241, 241.1, 241.2

[56] References Cited
U.S. PATENT DOCUMENTS

| | | | |
|---|---|---|---|
| 3,845,712 | 11/1974 | Lewicki, Jr. ........................ | 101/120 |
| 4,066,014 | 1/1978 | Van Haaften ....................... | 101/157 |
| 4,164,423 | 8/1979 | Schumacher et al. ............... | 106/20 |
| 4,251,276 | 2/1981 | Ferree, Jr. et al. ................... | 106/20 |

FOREIGN PATENT DOCUMENTS

| | | | |
|---|---|---|---|
| 59-198182 | 11/1984 | Japan .................................. | 428/914 |
| 59-209190 | 11/1984 | Japan .................................. | 428/914 |
| 63-170481 | 7/1988 | Japan .................................. | 428/195 |

OTHER PUBLICATIONS

Copy of International Search Report. Dated 8/23/90.
English abstracts of Japanese Publication Nos. 59-209190, 59-198182, 63-170481.

Primary Examiner—Pamela R. Schwartz
Attorney, Agent, or Firm—Sandler, Greenblum & Bernstein

[57] ABSTRACT

A ribbon ink has a viscosity that increases with increasing rate of shear for rates of shear greater then a predetermined value. A printer ribbon for use with an impact printer comprises a substrate containing ink having a viscosity that increases with increasing rate of shear for rates of shear greater then a predetermined value.

35 Claims, 3 Drawing Sheets

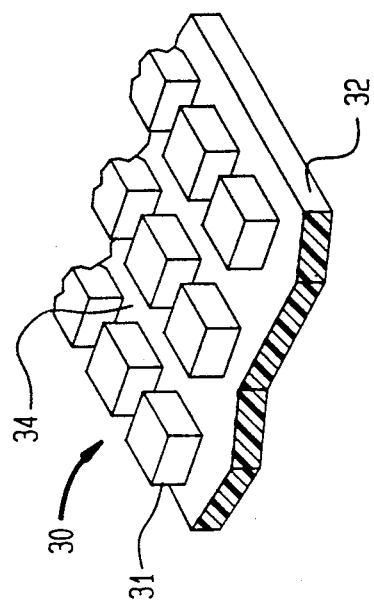
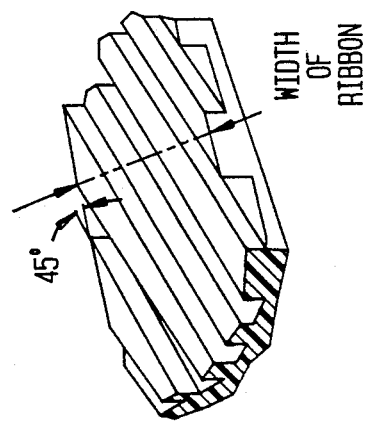
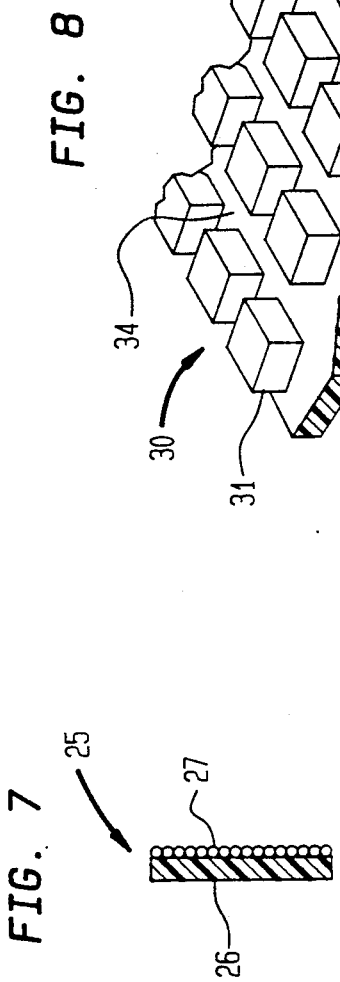
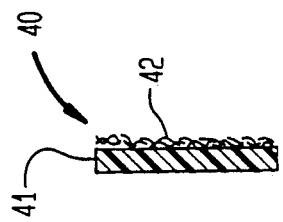
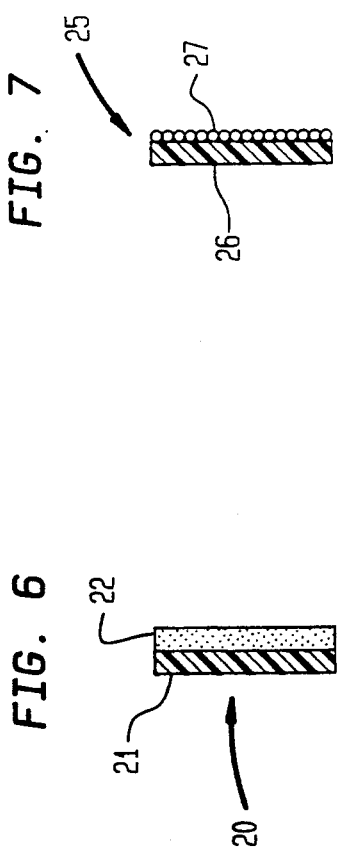
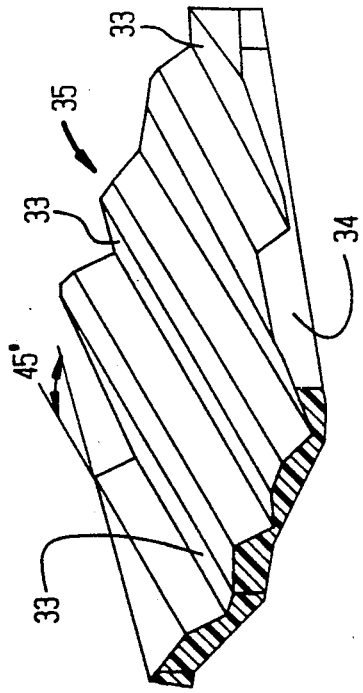

INK AND MULTISTRIKE RIBBONS INCORPORATING THE SAME

TECHNICAL FIELD

This invention relates to an improved ink and to multistrike ribbons incorporating the same.

BACKGROUND ART

Multistrike ribbons are used in connection with dot matrix, daisy wheel, and other impact printers, and are usually packaged in cartridges that are characterized by the number of impacts that can be obtained. Such number depends on various factors including the volume of ink on the ribbon in the cartridge, and the transfer characteristics of the ink/ribbon base combination. Knowing the cost of a cartridge and the number of characters that can be printed, one can compute the cost per impact which is a factor of considerable importance to a user in comparing cartridges.

When a print pin of a printer impacts a ribbon, the change in momentum of the ink in the ribbon due to the impulse of the print pin induces a flow of ink from the ribbon to the paper. If the ink is Newtonian (i.e., its viscosity is independent of the rate of shear), the viscosity of the ink, or its resistance to flow, is independent of the impulse applied to the ribbon by the print pin. Conventionally, however, inks used in multistrike ribbons are thixotropic (i.e., their viscosity changes inversely with rate of shear as shown in FIG. 1). At rest, prior to being struck by a print pin, the ink in the ribbon is viscous and does not ooze from the ribbon. On being struck by a print pin, the ink is subject to shear becomes less viscous and flows easily from the ribbon to the paper.

Multistrike ribbons are conventionally made using a carrier that includes either a plastic film or woven fabric. If the carrier were to include only a plastic film coated with thixotropic ink, all or nearly all of the ink on the film, within the projected area of a print pin, would be transferred from the film to the paper when the ribbon is struck by the print pin. The result would be a ribbon that lacks multistrike capability. Conventionally multistrike ribbons in which the carrier includes a plastic film are therefore provided with a porous layer on the side of the film facing the paper. Such layer has a large number of interstices that are filled with ink, only a measured amount of which is transferred to a piece of paper when the ribbon is struck. The structure of the layer serves to meter the flow of ink allowing multiple strikes on the same place on the ribbon to produce ink deposits on the paper.

Typically, the film is polyester and is coated with an open "sponge" of polymeric material filled with ink. In general, the polyester body is 10-30 microns thick and the "sponge" is from 8-50 microns thick with openings about 10 microns in diameter. These openings act to modify the flow of ink during impact thus metering the amount of ink transferred in response to striking the ribbon, enabling the ribbon to continue to transfer ink when struck a number of times in the same spot.

The deficiencies of this type of ribbon include reduced density uniformity for letters printed on previously struck areas of the ribbon and rapid degradation of the density and sharpness of the printed characters, the added cost of the sponge layer, and the large volume of cartridge taken up by the structure of the sponge. Other conventional multistrike ribbons use special fabrics that are woven to provide interstices for holding ink. Crimped nylon and silk are the materials presently favored for this purpose. The deficiency with this arrangement is the cost of the fabrics, the volume taken up by the ribbon base for a ribbon of this type, and the low multi-strike print quality.

It is therefore an object of the present invention to provide a new and improved ink for a multistrike ribbon which increases the number of usable characters printed by the ribbon and reduces the cost per impact.

BRIEF DESCRIPTION OF THE INVENTION

The present invention provides a ribbon ink having a viscosity that increases with increasing rate of shear beyond a predetermined rate of shear. Such an ink is termed herein as a shear thickening or dilatant type of ink.

A shear thickening ink according to the present invention may be Newtonian or even thixotropic below a threshold rate of shear; but at and beyond this threshold, the material stiffens and requires a large stress to effect flow. That is to say, a shear thickening ink according to the present invention flows under conditions of low stress, but strongly resists movement when stressed beyond a shear threshold. The increase in the viscosity above the threshold may abrupt or it may be gradual with increasing shear.

According to the present invention, particular shear thickening inks include carbon black having a specific area less than about 50 $m^2/gm$. Inks containing carbon black with a specific area in the range of about 8-50 $m^2/gm$ exhibit shear thickening properties while inks containing carbon black with a specific area greater than about 50 $m^2/gm$ fail to exhibit shear thickening properties. In addition, it has been found that carbon blacks having a specific area in the range 8-50 $m^2/gm$ have a relatively large particle size, with diameters greater than about 50 nanometers, and generally less than about 700 nanometers.

In addition to carbon black having the necessary physical properties, a shear thickening ink according to the present invention further comprises a mixture of a mineral oil and a dispersant. The choice of dispersant must be made experimentally to match the characteristics of the carbon black and the mineral oil, and it is believed that the degree of dispersion plays an important role in the properties of the ink. The percent weight of mineral oil to dispersant preferably ranges from about 85:15 to 80:20. The percent weight of carbon black to liquid (mineral oil and dispersant) is in the range of about 44% to 75%.

According to the present invention, a printer ribbon is provided for use with an impact printer comprising a substrate containing a shear thickening In one embodiment of the invention, the substrate comprises a polyester film having, on one surface thereof, a layer containing interstices containing the shear thickening ink. The layer may be formed of precipitated polymer. In another embodiment, the layer is formed of small diameter spheres adhered to one surface of the film. In such case, the spheres may be 30-50 micron diameter acrylic balls.

In another embodiment of the invention, the layer may be in the form of a pattern of channels on one surface of the film formed by embossing or by making depressions on the film. The width of these channels may vary from about 15-75 microns. Alternatively, the pattern may be in the form of elongated channels that are oriented at an acute angle, preferably about 45°, to the longitudinal direction of the ribbon. The cross-section of the channels may be V-shaped with a width of about 15 to 75 microns, or may be rectangular with a width and spacing of about 8–75 microns.

In another embodiment of the invention, the layer may be a polyurethane foam impregnated with a shear thickening ink. Preferably, the foam is bonded to the film. Alternatively, no separate bonding of the foam to the film is required when the wetting of the ink under static conditions is sufficient to maintain the mechanical connection of the foam to the film.

The invention also includes a ribbon in which the layer is a non-woven fabric attached to the film. Preferably no separate bonding of the non-woven fabric to the film is required when the wetting of the ink under static conditions is sufficient to maintain the mechanical connection of the non-woven fabric to the film. In a modification of this embodiment, the fabric may be coated with a thin layer of polyurethane on one side and the film omitted.

In a further embodiment, the layer may be a sheet of melt blown fibers deposited on a polyester base that is calendered smooth and attached by bonding to the film.

The invention also comprises making a printing ribbon for use with an impact printer by applying a shear thickening ink to a substrate. The method may include the application of a coating of polymeric particles to a plastic film, and heating the coated film to sinter the particles into a sponge-like substrate for holding the ink in the interstices in the substrate. Alternatively, the ink may be mixed with the particles and applied to the film before the heating step, or may be applied to the substrate after the heating step.

DESCRIPTION OF DRAWINGS

Embodiments of the present invention are shown in the accompanying drawings wherein:

FIGS. 6–11 are cross-sections of various embodiments of a ribbon according to the present invention.

DETAILED DESCRIPTION

Figure 1:
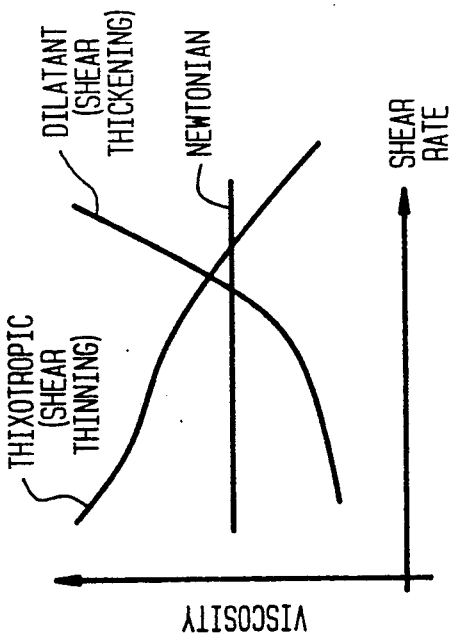
FIG. 1 is a graph showing the relationship between viscosity and shear rate for thixotropic (shear thinning), Newtonian and shear thickening liquids.

Referring now to the drawings, FIG. 1 shows the qualitative differences between liquids that are termed Newtonian, shear-thinning (sometimes referred to herein as thixotropic), and shear-thickening (sometimes referred to herein as dilatant). A liquid that is Newtonian (such as water), has a viscosity at a given temperature which is independent of the rate of shear of the liquid (i.e., the rate at which a strata of liquid moves relative to an adjacent strata).

A liquid that is shear thinning has a viscosity, at a given temperature, which decreases with the rate of shear. A thixotropic liquid (such as latex paint) will thus coalesce and not run under static conditions; yet such liquid can be spread easily by inducing shear in the liquid by brushing, for example.

Finally, a shear-thickening (dilatant) liquid has a viscosity at a given temperature which increases with the rate of shear above a particular rate of shear. Such a liquid flows easily when gently stirred, but becomes very stiff when an attempt is made to stir the liquid rapidly. The point at which the viscosity changes very rapidly is referred to as the dilatancy point. In this sense, a shear thickening liquid responds to shear in a manner analogous to a viscoelastic material such as "silly putty" which is easily kneaded by hand, yet is elastic when bounced against a surface, and is brittle in reaction to an applied impulse. For shear rates below the dilatancy point, the material may be Newtonian or thixotropic.

Figure 2:
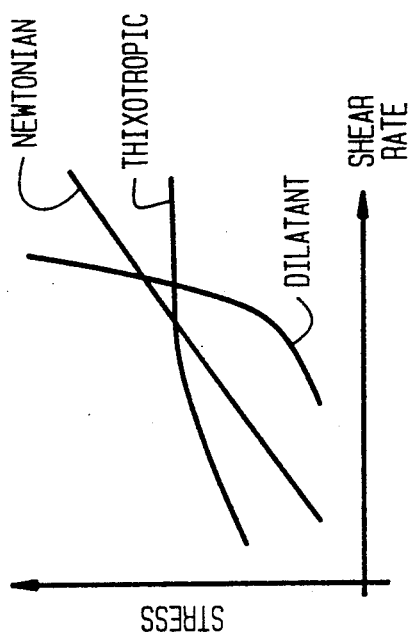
FIG. 2 is graph showing the relationship of stress to shear rate for the materials shown in FIG. 1.

FIG. 2 is a graph similar to FIG. 1 but showing the stress response of Newtonian, thixotropic, and dilatant liquids to the shear rate applied to the liquids. This graph illustrates merely another parameter of the liquids.

Figure 3:
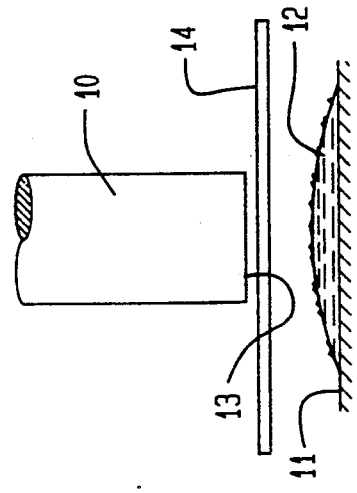
FIG. 3 is a schematic showing of a print pin covered with paper about to strike a pool of ink on an anvil.

The response of a shear thickening ink as compared to the response of conventional thixotropic and Newtonian inks in an impact printing environment is illustrated in FIG. 3 which shows pin 10 moving downwardly towards anvil 11 having pool 12 of ink in the path of end surface 13 on the pin. Sheet of paper 14 is interposed between surface 13 and the ink on the anvil.

Regardless of the nature of the ink, the initial impact of the pin and paper with the ink induces a shear in the ink in the impact area defined by surface 13, the rate of shear being low initially but increasing rapidly. If the ink is thixotropic, its initial viscosity will be relatively high; but as the rate of shear increases with terminal movement of the print head against the anvil, the shear-thinning property of the ink will manifest itself. Consequently, with both thixotropic and Newtonian ink, the ink will splatter over a large region surrounding the impact region, and a considerable quantity will be absorbed by the paper over a region much larger than the projected area of the pin.

On the other hand, if the ink is shear thickening, it will have a low viscosity at the instant of impact thereby allowing for the wetting of the paper in a region defined by the projected area of the pin. As the impact proceeds, however, and the ink tends to move outwardly of the impact region, the shear-thickening property of the ink will manifest itself as the ink stiffens and stops moving. When the impact is removed, a thin film of ink is left on the paper essentially confined to the projected area of the pin, and the pool of ink on the anvil is relatively undisturbed.

This operation illustrates the basic idea behind the use of a dilatant ink for impact printing: the shear-thickening property of the ink itself limits the transfer of ink to paper. In conventional impact printing using thixotropic or Newtonian ink, an external structure such as the interstices of a woven fabric is necessary to limit ink transfer on impact. As a consequence, a ribbon carrying dilatant ink may be very much more open than a ribbon carrying Newtonian or thixotropic ink, allowing a given volume of ribbon using shear thickening ink to contain a higher percentage of ink than a conventional ribbon.

A particular shear thickening ink according to the present invention comprises a mixture of mineral oil, a dispersant, and carbon black having a critical surface area per unit weight. The mineral oil should have a low viscosity, so that the resultant viscosity of the ink below the dilatancy point is as low as possible, a high boiling point, and a low vapor pressure (to inhibit drying of the ink in the ribbon). The dispersant (a material having a polar end and a non-polar end) is chosen to be compatible with the mineral oil and the carbon black as is known in the art.

Carbon black characterized by a small specific area (defined as the surface area per unit weight in square meters per gram, $m^2/gm$) renders the ink dilatant. It has been found that carbon black having a specific area of about 8 $m^2/gm$ has a sharp dilatancy point and works very well in ribbons of various configurations. Carbon black having a specific area in the range 20–45 $m^2/gm$ also works satisfactorily, but the dilatancy point is less sharp. When the specific area exceeds about 50 $m^2/gm$, the resultant ink does not exhibit substantial dilatancy.

Another physical parameter associated with the carbon blacks which have been found to form a shear thickening ink is the particle size. It has been found that inks prepared 7 with carbon blacks having particles with diameters greater than about 200 nanometers appear to have high dilatancy. Carbon blacks with diameters in the range of 50 to 70 nanometers also work satisfactorily, but the dilatancy point is less sharp.

Dilatant inks have been produced using the following types of carbon black:

| Brand | Manufacturer | Approx. Specific Area | Approx. Diameter |
|---|---|---|---|
| Sevcarb MT-LS | Sevalco, Bristol UK | 8 $m^2/gm$ | 200–700 nm |
| Printex G | Degussa, FRG | 30 $m^2/gm$ | 51 nanometer |
| Elftex 180 | Cabot | 37 $m^2/gm$ | 50 nanometer |
| Raven 14 | Columbian Chemicals | 45 $m^2/gm$ | 59 nanometer |
| Raven 410 | Columbian Chemicals | 24 $m^2/gm$ | 70 nanometer |
| Raven 16 | Columbian Chemicals | 25 $m^2/gm$ | 61 nanometer |
| Raven 22 | Columbian Chemicals | 20 $m^2/gm$ | 62 nanometer |

At present the preferred material is Sevcarb MT-LS.

Shear thickening inks have been produced using the following mineral oils:

(1) PAZDINA 15 manufactured by PAZ Oil Co., Israel. This is a "medical quality paraffin oil" with a viscosity of about 13 centipoise at 40° C. and is the preferred oil.

(2) MARCOL 62 manufactured by Exxon, with a viscosity of about 9.4 centipoise at 40° C. with a viscosity of about 2.5 centipoise at 25° C. ISOPARS tend to evaporate more readily than the other oils used and is thus less desirable.

(4) NORPAR 15 manufactured by Exxon, with a viscosity of about 2.5 centipoise at 25° C.

Shear thickening inks have been produced using a number of dispersants such as OLOA 1200 and OLOA 374Q manufactured by Chevron, with the OLOA 374Q being the preferred dispersant. At present, the exact nature of the dispersant does not appear to be critical, and it is expected that other types of dispersants will work as well.

Extensive tests have been made on dilatant inks made from the above constituents. Typically, dilatant inks have been produced using a liquid base comprising a mixture of 85% weight mineral oil (PAZDINA 15) and 15% weight dispersant (OLOA 374Q) and the following amounts of carbon black:

(1) 75% weight SEVCARB MT/LS and 25% weight liquid base;
(2) 50% weight PRINTEX G and 50% weight liquid base; liquid
(3) 44.4% weight ELFTEX 180 and 55.6% weight base.

Figure 5:
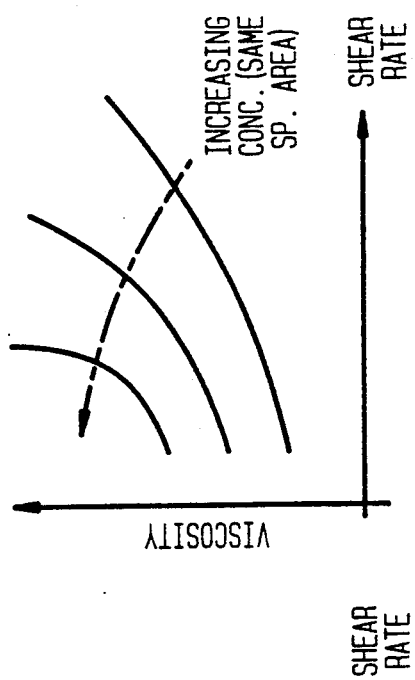
FIG. 5 is a chart like FIG. 4 but showing the effect of increasing the concentration of solid particles to liquid for particles having the same specific area.
Figure 4:
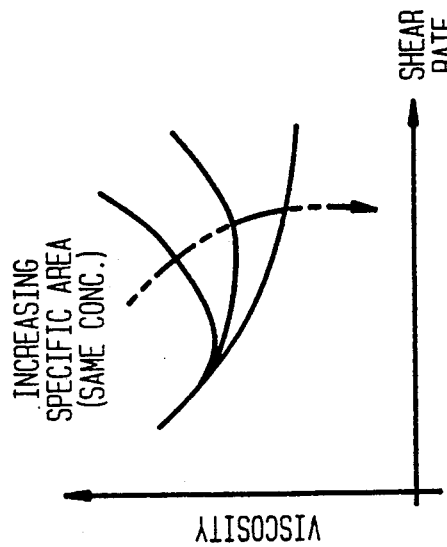
FIG. 4 is a graph showing the relationship between viscosity and shear rate for inks having different specific areas of the carbon black particles, but having the same concentration of carbon black to liquid.

Additional shear thickening inks have been made using a liquid base comprising a mixture of 80% weight mineral oil NORPAR 15) and 20% weight dispersant (OLOA 374Q) and the following amounts of carbon black:

(4) 50% weight RAVEN 14 and 50% weight liquid base;
(5) 40% weight RAVEN 410 and 60% weight liquid base;
(6) 50% weight RAVEN 16 and 50% weight liquid base;
(7) 50% weight RAVEN 22 and 50% weight liquid base;
(8) 55.6% weight ELFTEX 180 and 44.4% weight liquid base;
(9) 47.7% weight PRINTEX G and 52.3% weight liquid base;

It has been found that higher solids proportions lead to a very viscous ink under low shear conditions, and that higher particle size and lower specific area carbon blacks require less liquid base. Moreover, all of these shear thickening inks are thixotropic at shear rates below the dilatancy point Experimental results are shown quantitatively in Figs. 4 and 5. FIG. 4 shows that increasing the specific area of the carbon black while maintaining the same concentration of carbon black to liquid base reduces the sharpness of the dilatancy effect, and reduces the low shear viscosity. FIG. 5 shows that increasing the concentration of carbon black in the liquid base while maintaining the same specific area increases the sharpness of the dilatancy effect which occurs at a lower shear rate, and increases the low shear viscosity.

Shear thickening inks have also be produced comprising mineral oil, dispersant and solid materials other than carbon black. These solid materials included: Lake Black H (manufactured by Bayer), barium carbonate, calcium carbonate, zirconium oxide, iron oxide, Volstonyt, antimony oxide and aluminum oxide.

The present invention also consists in ribbons incorporating dilatant ink. Referring to FIG. 6, reference numeral 20 designates the first embodiment of what is termed herein a "small-pore" ribbon, so called because it has openings comparable to the openings in ribbons impregnated with conventional ribbon ink. Ribbon 20 comprises film base 21 of polyester much like a conventional impact ribbon film, and separate layer 22 of material containing shear thickening ink. A ribbon according to the present invention was constructed following the procedure described below. A 15 mixture of approximately 20% polymeric particles (SURLYN 1706 manufactured by DuPont) and 80% shear thickening ink according to the present invention was prepared and applied to one surface of the film. The coated film was heated to a temperature at which the sintering of the polymeric particles occurred thus creating an ink filled sponge layer. In a variation of this procedure, only the polymeric material was applied to a polyester film and sintered as before. A shear thickening ink was applied to the sintered layer after the sintering process. In both cases, the resultant ribbon can be described as a film base having a layer with small pores.

Another small-pore ribbon according to the invention was produced by dissolving 20% by weight of ELVAX II, manufactured by DuPont, in heated ISO-PAR, manufactured by EXXON, to produce a mixture that was coated on one surface of a polyester film. Upon cooling, the ELVAX II precipitates forming an open cell sponge layer subsequently filled with shear thickening ink. Because the shear thickening ink has a relatively low viscosity under low shear conditions, procedures like those described below can be used to fill the sponge-like layer on the polyester film.

The shear thickening nature of the ink according to the present invention also allows the use of "large-pore", so called because the size of the pores are considerably larger than the size of the pores found in conventional multistrike ribbons into which conventional ribbon ink is incorporated. So-called large pore ribbons can be manufactured following the steps described below. In the first of the large-pore ribbons designated by reference numeral 25 in FIG. 7, one surface of polyester film 26 is coated with an adhesive, preferably thermoplastic. A single layer of 30–50 micron diameter acrylic balls 27 is then adhered to the adhesive covered surface of the film. Ribbon 25 is then inked by applying dilatant ink to the ball-covered surface of the film. The ink may be applied in the 5 form of drops or in a rivulet. Because of the relatively low viscosity of the dilatant ink under low shear conditions, the ink will flow into and fill the interstices created by the balls.

In the second of the large pore ribbons designated by reference numeral 30 in FIG. 8, a pattern of closely spaced projections or bumps 31 is formed in one surface of film 32. This may be achieved by a forming operation that permits the opposite side of the film to remain flat. Bumps 31 form a plurality of interconnected depressions 34 whose width is in 25 the range of 15–75 microns, and which are filled with shear thickening ink. The bumps may be cubic with each side being in the range of 15–75 microns. The shape and size of the bumps is not believed to be critical consistent with being small compared to the cross-section of the print pin with which the ribbon is to be used.

Alternatively, as shown in FIG. 9, a pattern of elongated, preferably V-shaped depressions can be formed on one surface of a film as shown by troughs 33 in film 34 of ribbon 35. Preferably, troughs 33 are arranged in rows that make a 45° angle to the longitudinal direction of film 34. Other inclinations are of course possible. This configuration effects the flow of ink from the periphery of the ribbon towards the center where the pins of a printer contact the ribbon thus replenishing ink removed from the active region of the ribbon. Furthermore, the angularity of the pattern of troughs enhances the strength of the ribbon in the direction of its stress during use, which is the direction of movement.

FIG. 10 shows a variation of the embodiment shown in FIG. 9. In FIG. 10, the grooves or depressions in the ribbon are rectangular in cross-section rather than V-shaped The grooves may be 8–75 microns across. A ribbon with 10 micron grooves and 10 micron lands between adjacent grooves may be suitable. The angularity of the grooves relative to the longitudinal direction of the ribbon is preferably about 45°. This angularity is a compromise between ribbon strength and allowing flow of ink from the (unstruck) margins of the ribbon to replenish the ink transferred to the paper on impact.

Another embodiment of ribbon according to the present invention includes a polyester film on one surface of which is bonded a layer in the form of a thin foamed open celled filmless polyurethane sponge with large (i.e., greater than 10 micron) pores, and preferably with pores greater than about 50 microns. This type of ribbon is illustrated in FIG. 6. After foaming, a sponge is formed without a skin; and the interstices of the sponge are then filled with ink. Material of this type is available from W. R. Grace and Company, Organic Chemicals division, under the trade name Hypol, foamable hydrophilic urethane polymers, experiments with this type of ribbon using conventional inks, impacting of the ribbon with printer pins invariably resulted in splattering of the ink. When shear thickening inks of the invention were used, no splattering was evident.

A variation of the foam sponge/film ribbon results when the sponge is not bonded to the film. In such case, the foam is retained on the film by the wetting of the ink which intimately contacts the film at the interface between the sponge and the film.

Another embodiment of ribbon according to the invention is designated by reference numeral 40 in FIG. 11. Ribbon 40 comprises polyester film 41 to which non-woven fabric 42 is adhered. Fabric 42 is formed of spun fibers, preferably polyester fibers about 10–15 microns in diameter. The resultant fabric has a thickness in the range 40–100 microns, and has an open structure with spaces ranging in size up to 100 microns. These spaces are filled with dilatant ink.

A variation of the non-woven fabric/film ribbon results when the fabric is not bonded to the film. In such case, the fabric is retained on the film by the wetting of the ink which intimately contacts the film at the interface between the fabric and the film.

In a variation of ribbon 40, one side of fabric 42 is coated with a thin layer (2–10 microns) of polyurethane which stretches and then recovers when impacted. The layer thus forms a backing for the fabric, replacing the film; the cross section of the ribbon so produced is similar to that shown in FIG. 11.

Another embodiment of ribbon according the present invention includes a polyester film to which is bonded a layer comprising melt-blown fibers. The layer is formed by blowing fibers of 1–10 microns diameter onto the base, and then calendering the combination to form a non-woven fabric which can be bonded to the film. The fabric so formed is even less dense than fabric 42. In an alternative arrangement, the layer need not be bonded to the film because the dilatant ink in the interface between the film and the layer serves to retain the two.

Other embodiments of ribbon may utilize a non-woven polyester fabric or even paper which is of course non-woven.

In alternative embodiments of the invention the polyester films used may be replaced by film produced of material which remains essentially elastic under impact printing. Such elastomeric materials as for example polyurethane stretch and recover when impacted, which can cause less distortion of the ribbon under the large number of impressions possible with ribbons of the present invention.

In order to ink the ribbons of the invention, shear thickening ink may be placed on the surface of the ribbon to be inked in drops or in rivulets as described above. A preferred manner of applying the ink to a ribbon is to use a gravure roller which applies spots of shear thickening ink to the ribbon surface. Subsequently the ink flows by capillary action into the main structure of the ribbon.

In a modification of this technique, the dilatant ink may be diluted with a highly volatile solvent to reduce the viscosity of the ink as it is applied to the ribbon. After the ink penetrates into the ribbon, the solvent will evaporate. Alternatively, the dilatant ink may be heated to reduce its viscosity during application. This permits freer flow and permits the use of mechanical applicators that produce higher shears in the ink during application.

Figure 12:
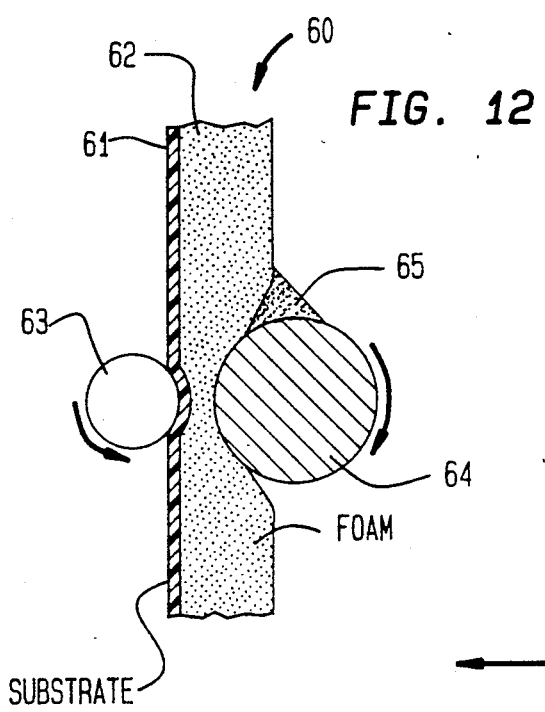
FIGS. 12–13 illustrate two techniques for applying shear thickening ink to ribbons according to the present invention.

FIG. 12 shows one method for by which shear thickening ink can be forced into a foam or sponge. Ribbon 60, having plastic backing 61 and foam or sponge-like resilient layer 62 is fed between backing roller 63 and application roller 64. The spacing or bite between these rollers is such as to compress layer 62 as one or the other or both of the rollers is rotated thus drawing the ribbon downwardly between the bite of the rollers. Shear thickening ink 65, in a reservoir formed between compressed layer 62 and roller 64, is deposited on the surface of the foam and is drawn thereinto as the latter expands below the bite. The rate of rotation of the rollers must be such that the ink does not "freeze" from the induced shear.

Figure 13:
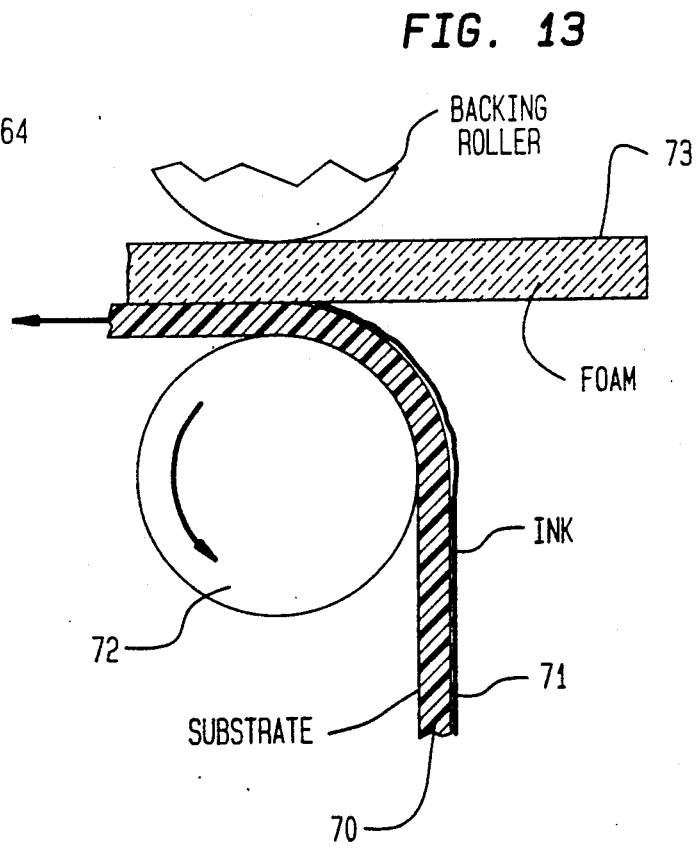

FIG. 13 shows another method suitable for use with layers that need not be bonded to the polyester film. In this approach, one surface of film 70 is coated with ink as indicated by reference numeral 71; and the uncoated surface engages roller 72 which draws the film in the direction of the arrow. One surface of layer 73 engages inked layer 71 on film 70 as a backup roller (not shown) cooperates with feed roller 72 and feeds the combination of layer 73 and film 72 in the direction of the arrow. The ink flows into the interstices in the layer; and a force is created that holds the layer to the film.

The advantages of the present invention lie in the increased amount of ink per unit volume of ribbon that can be achieved as compared with ribbons of the prior art, and the self-metering capability of the ribbons according to the invention. Thus, ribbons according to the invention permit more strikes to be achieved on the same area of ribbon. In addition, the optical density of characters printed by restriking the same area of the ribbon is more consistent for a larger number of strikes than for ribbons with conventional inks and structures. Finally, many embodiments of the present invention have a simpler structure and are thus less expensive to produce and provide more strikes per ribbon.

The advantages and improved results furnished by the method and apparatus of the present invention are apparent from the foregoing description of the preferred embodiments of the invention. Various changes and modifications may be made without departing from the spirit and scope of the invention as described in the claims that follow.

We claim:

1. A printer ribbon, for use with an impact printer, comprising: a substrate, and a dilatant ink coated on and/or impregnated into the substrate.

2. A printer ribbon according to claim 1 wherein the ink includes carbon black having a specific area less than about 50 m$^2$/gm.

3. A printer ribbon according to claim 2 wherein the specific area is in the range of about 8–50 m$^2$/gm.

4. A printer ribbon according to claim 2 wherein the specific area is not greater than about 35 m$^2$/gm.

5. A printer ribbon according to claim 2 wherein the ink further comprises a mineral oil and a dispersant.

6. A printer ribbon according to claim 5 wherein the percent weight of carbon black to (mineral oil and dispersant is in the range of about 44% to 75%.

7. A printer ribbon according to claim 6 wherein the percent weight of mineral oil to dispersant is 85:15.

8. A printer ribbon according to claim 6 wherein the percent weight of mineral oil to dispersant is 80:20.

9. A printer ribbon according to claim 1 wherein the substrate comprises a polyester film carrying, on one surface thereof, a layer containing interstices containing said ink.

10. A printer ribbon according to claim 9 wherein the said layer is formed of sintered polymeric particles.

11. A printer ribbon according to claim 9 wherein the said layer is formed of a precipitated polymer.

12. A printer ribbon according to claim 9 wherein said layer is formed of small diameter spheres adhered to one surface of the film.

13. A printer ribbon according to claim 12 wherein the spheres are acrylic balls about 30–50 microns in diameter.

14. A printer ribbon according to claim 12 wherein the layer is one sphere thick.

15. A printer ribbon according to claim 9 wherein said layer is an open celled foam.

16. A printer ribbon according to claim 15 wherein said foam layer is bonded to said film.

17. A printer ribbon according to claim 15 wherein the foam layer is attached to said film.

18. A printer ribbon according to claim 9 wherein said layer is a non-woven fabric attached to said film.

19. A printer ribbon according to claim 10 wherein the fabric is bonded to said film.

20. A printer ribbon according to claim 18 wherein said fabric has a thickness in the range 40–100 microns and is formed of synthetic fibers whose diameter is in the range 10–15 microns.

21. A printer ribbon according to claim 9 wherein said layer is a layer of melt blown fibers deposited on the polyester film and calendered smooth.

22. A printer ribbon according to claim 21 wherein said layer is bonded to said film.

23. A printer ribbon according to claim 21 wherein said layer is attached to said film.

24. A printer ribbon according to claim 1 wherein said substrate has a surface that includes a plurality of depressions containing said ink.

25. A printer ribbon according to claim 24 wherein the width of said depressions ranges from 8–75 microns.

26. A printer ribbon according to claim 24 wherein the depressions are elongated troughs.

27. A printer ribbon according to claim 26 wherein said troughs are parallel to each other and inclined to the longitudinal direction of the ribbon.

28. A printer ribbon according to claim 27 wherein the inclination of the troughs relative to the longitudinal direction is at an angle of about 45°.

29. A printer ribbon according to claim 26 wherein the troughs are about 8–75 microns wide.

30. A printer ribbon according to claim 25 wherein said substrate comprises anon-woven fabric.

31. A printer ribbon according to claim 30 wherein said non-woven fabric is coated with a thin film.

32. A printer ribbon according to claim 31 wherein said film is polyurethane.

33. A printer ribbon according to claim 1 wherein said substrate comprises a material which is essentially elastic under impact printing.

34. A ribbon according to claim 1 wherein said substrate contains pores having a size greater than about 10 microns.

35. A ribbon according to claim 1 wherein said substrate is elastomeric.

* * * * *